(12) United States Patent
Topaloglou et al.

(10) Patent No.: US 6,931,396 B1
(45) Date of Patent: Aug. 16, 2005

(54) BIOLOGICAL DATA PROCESSING

(75) Inventors: Thodoros Topaloglou, Menlo Park, CA (US); Anthony Kosky, Berkeley, CA (US)

(73) Assignee: Gene Logic Inc., Gaitherburg, MD (US)

( * ) Notice: Subject to any disclaimer, the term of this patent is extended or adjusted under 35 U.S.C. 154(b) by 55 days.

(21) Appl. No.: 10/018,461

(22) PCT Filed: Jun. 28, 2000

(86) PCT No.: PCT/IB00/00863
§ 371 (c)(1),
(2), (4) Date: Oct. 14, 2003

(87) PCT Pub. No.: WO01/01294
PCT Pub. Date: Jan. 4, 2001

Related U.S. Application Data

(60) Provisional application No. 60/141,424, filed on Jun. 29, 1999.

(51) Int. Cl.[7] .............................................. G06F 17/30
(52) U.S. Cl. ...................... 707/4; 707/2; 707/3; 707/6; 707/7; 707/8; 707/10; 702/19
(58) Field of Search ............................. 707/2, 3, 4, 6, 707/7, 8, 10; 702/19; 706/12

(56) References Cited

U.S. PATENT DOCUMENTS

| | | | |
|---|---|---|---|
| 5,495,606 A | 2/1996 | Borden et al. ............... | 703/3 |
| 5,569,580 A | 10/1996 | Young .......................... | 435/2 |
| 5,589,337 A | 12/1996 | Farr ............................. | 435/6 |
| 5,634,053 A | 5/1997 | Noble et al. .................. | 707/4 |
| 5,692,107 A | 11/1997 | Simoudis et al. ............. | 706/12 |
| 5,702,915 A | 12/1997 | Miyamoto .................... | 435/32 |
| 5,736,354 A | 4/1998 | Fielden et al. ................ | 435/29 |
| 5,769,074 A | 6/1998 | Barnhill et al. .............. | 600/300 |
| 5,787,425 A | 7/1998 | Bigus ............................ | 707/6 |
| 5,811,231 A | 9/1998 | Farr et al. ..................... | 435/6 |
| 5,835,755 A * | 11/1998 | Stellwagen, Jr. .............. | 707/3 |
| 5,873,083 A | 2/1999 | Jones et al. ................... | 707/4 |
| 5,893,095 A * | 4/1999 | Jain et al. ..................... | 707/6 |
| 5,933,818 A * | 8/1999 | Kasravi et al. ............... | 706/12 |
| 6,109,776 A | 8/2000 | Haas ............................. | 702/20 |
| 6,128,608 A | 10/2000 | Barnhill ....................... | 706/16 |
| 6,160,105 A | 12/2000 | Cunningham et al. ....... | 536/23.1 |
| 6,201,176 B1 * | 3/2001 | Yourlo .......................... | 84/609 |
| 6,308,170 B1 | 10/2001 | Balaban ........................ | 707/3 |
| 6,309,822 B1 | 10/2001 | Fodor et al. ................... | 435/6 |
| 6,418,382 B2 | 7/2002 | Rothberg et al. ............. | 702/20 |
| 6,427,141 B1 | 7/2002 | Barnhill ........................ | 706/16 |
| 6,470,277 B1 | 10/2002 | Chin et al. .................... | 702/19 |
| 6,606,622 B1 * | 8/2003 | Sorace et al. ................. | 707/4 |

FOREIGN PATENT DOCUMENTS

EP          0747842 A1 * 12/1996

OTHER PUBLICATIONS

Bassett, D., Jr., et al., "Gene Expression Informatics—It's All in Your Mine," Nature Genetics Supplement, vol. 21, Jan. 1999, pp. 51–55.

(Continued)

Primary Examiner—Thuy N. Pardo
(74) Attorney, Agent, or Firm—Procopio Cory Hargreaves & Savitch

(57) ABSTRACT

A multi-database query system which queries a plurality of databases and servers, including an input which receives queries in a structured form and a translation server which translates at least a part of a received query into commands recognized by a data manipulation server.

20 Claims, 2 Drawing Sheets

OTHER PUBLICATIONS

Canfield, K., et al., "Mapping XML Documents into Databases: A Data–Driven Framework for Bioinformatic Data Interchange," AMIA Symposium, Nov. 2000, pp. 121–125.

Duggan, D. et al., "Expression Profiling Using cDNA Microarrays," Nature Genetics Supplement, vol. 21, Jan. 1999, pp. 10–14.

Ermolaeva, O., et al., "Data Management and Analysis for Gene Expression Arrays," Nature Genetics Supplement, vol. 20, Sep. 1998, pp. 19–23.

Rebhan, M., et al., "GeneCards: A Novel Functional Genomics Compendium with Automated Data Mining and Query Reformulation Support," Bioinformatics, vol. 14, No. 8, 1998, pp. 656–664.

Tarczy–Hornoch, P., et al. "GeneClinics: A Hybrid Text/Data Electronic Publishing Model Using XML Applied to Clinical Genetic Testing," J. Amer. Med. Inform. Assoc., vol. 7, No. 3, 2000, pp. 267–276.

* cited by examiner

BIOLOGICAL DATA PROCESSING

This application claims the benefit of Provisional Application No. 60/141,424, filed Jun. 29, 1999.

FIELD OF THE INVENTION

The present invention relates to automated database searching and in particular to automated access to biological databases.

BACKGROUND OF THE INVENTION

One of the tasks performed in biological research is comparison of newly discovered biological data with data stored in databases. Over two hundred public biological databases are available around the world, many on the Internet. In general, databases include a plurality of records which have the form of an object class. The object class is formed of a plurality of fields, often in a hierarchy in which an object class includes one or more sub-object classes which in turn may include sub—sub object classes. The records may represent, for example, gene sequences and may have fields which include various data about the sequences, such as their length, origin and a view of the sequence. Information is extracted from databases by querying a management system associated with the database. A simple query includes a request to display one or more fields of records which fulfill a certain criteria.

The existing databases have different organization methodologies, e.g., different fields in each record and different query schemes. In order to access these databases with ease, an Object Protocol Model (OPM) suite of tools was developed. An OPM processor mediates between a user and databases associated with the OPM suite. A common organization methodology is used to represent the data in all the databases accessed via the OPM processor. Queries addressed to databases via the OPM processor are provided, by a user to the OPM processor, in a structured form expressed in accordance with the common organization methodology. The OPM processor translates the queries from the structured OPM form to query forms compatible with the management systems of the specific databases to which the queries are addressed. The results from the specific databases are returned to the OPM processor which translates the results back to the organization methodology of the OPM suite. Not only does the OPM suite allow a user to access a plurality of different databases in different forms, it also allows the user to access a plurality of databases using a single query. For example, a complex query may request to display the records from a first database which have a gene length greater than of corresponding records of a second database which represent the same organism.

The use of a common organization methodology across databases allows using special tools for more easily generating queries and/or performing more complex queries. For example, a graphic user interface (GUI) of the OPM suite allows the user to prepare a query in a structured manner.

Some of the forms of biological data are complex data structures, such as gene sequences, which require special procedures for manipulation, for example, for performing comparisons. Homology search engines, such as BLAST, are used to compare gene sequences. When a user wants to compare, for example, all the gene sequences classified in a certain month to one or more groups of gene sequences, the user retrieves all the desired classified gene sequences using OPM. Then, the user passes the retrieved data to a homology sequence server which performs the sequence comparison.

SUMMARY OF THE INVENTION

One aspect of some embodiments of the invention provides a method for accessing data manipulation servers using a structured query format used to query databases. Optionally, the accessing of manipulation servers is integrated with the accessing of database information, for example by manipulating the results of the data access and/or by using the results of the data manipulation as data to be accessed or for restricting queries.

One aspect of some embodiments of the present invention relates to a multi-database query system which receives queries which relate to both database and data manipulation servers, such as homology search engines. The queries relate to the data manipulation servers as if they are database servers, allowing use of any tool of the multi-database query system developed for database queries, on queries which access data manipulation servers. Such tools include, for example, database linking tools, graphic query preparation tools and query optimization tools. By relating to databases and data manipulation servers from a single query, the data manipulation server may process results from the database as they are provided before the database runs through all its records. Alternatively or additionally, the results of a data manipulation step may be further queried. Thus, the response time required for a complex query may be substantially reduced. Alternatively or additionally, the amount of traffic on a network may be reduced and/or better spread out in time. Also, complex operations may require less of a user intervention.

In some embodiments of the present invention, the input to and/or output from of the data manipulation servers are modeled by structured objects. The modeled input objects may result from processing other sections of the query. The modeled output objects may be further processed by other sections of the query or even further manipulated by other (or the same) manipulation servers.

In some embodiments of the invention, each data manipulation server associated with the query system has a translation server which mediates between the data manipulation server and the query system. The translation server receives commands from the server in a structured query form used by the query system and translates the commands to a form in which the data manipulation server receives commands. The translation server optionally also receives results from the data manipulation server and presents the results to the query system in objects organized according to structured object classes used by the query system.

There is thus provided in accordance with an embodiment of the invention, a multi-database query system which queries a plurality of databases and servers, including an input which receives queries in a structured form, and a translation server which translates at least a part of a received query into commands recognized by a data manipulation server.

Optionally, the system comprises a processor which parses the received query into parts according to the databases and servers to which they relate. Alternatively or additionally, the structured form comprises a form used to query databases. Alternatively or additionally, the input receives a query which relates to at least one database and at least one data manipulation server. Alternatively or additionally, the translation server models results from the data manipulation server into database objects. Alternatively or additionally, the data manipulation server comprises a server which receives input from a least two different sources. Optionally, the data manipulation server comprises a homology comparison engine.

There is also provided in accordance with an embodiment of the invention, a method of accessing a data manipulation server from a multi-database query system, including providing the query system with a query which includes a first directive assigning a value to at least one field of an input object associated with the data manipulation server and a second directive which determines a value of at least one field of an output object associated with the data manipulation server, and invoking the data manipulation server responsive to the second directive. Optionally, providing the query comprises preparing the query using a graphical interface designed for querying structured databases. Alternatively or additionally, the data manipulation server comprises a homology engine.

There is also provided in accordance with an embodiment of the invention, a method of performing a database search using a multi-database query system, including providing the query system with a query which includes at least one directive related to a database and at least one directive related to a data manipulation server, wherein the directives are stated in an identical structural format, translating the directives into commands recognized by the database and the data manipulation server, and submitting the commands respectively to the data manipulation server and to the database.

Optionally, the data manipulation server comprises a homology comparison engine. Alternatively or additionally, translating the directives comprises identifying, by a query processor, the directives directed to the database and the directives directed to the data manipulation server. Optionally, translating the directives comprises passing the directives to translation servers associated with the database or data manipulation server to which the directives are directed. Alternatively or additionally, the method comprises determining an order for the directives to be processed in and submitting the translated directives to the data manipulation server and to the database according to the determined order.

In some embodiments, the method comprises receiving results from said submission and translating the results into structured objects. Optionally, translating the results into structured objects comprises translating the results to structured objects related to the directives.

Alternatively or additionally, providing a query comprises providing a query in an Object Protocol Model (OPM)-like language.

BRIEF DESCRIPTION OF FIGURES

Particular embodiments of the invention will be described with reference to the following description of embodiments in conjunction with the figures, wherein identical structures, elements or parts which appear in more than one figure are preferably labeled with a same or similar number in all the figures in which they appear, in which.

DETAILED DESCRIPTION OF EMBODIMENTS

Figure 1:
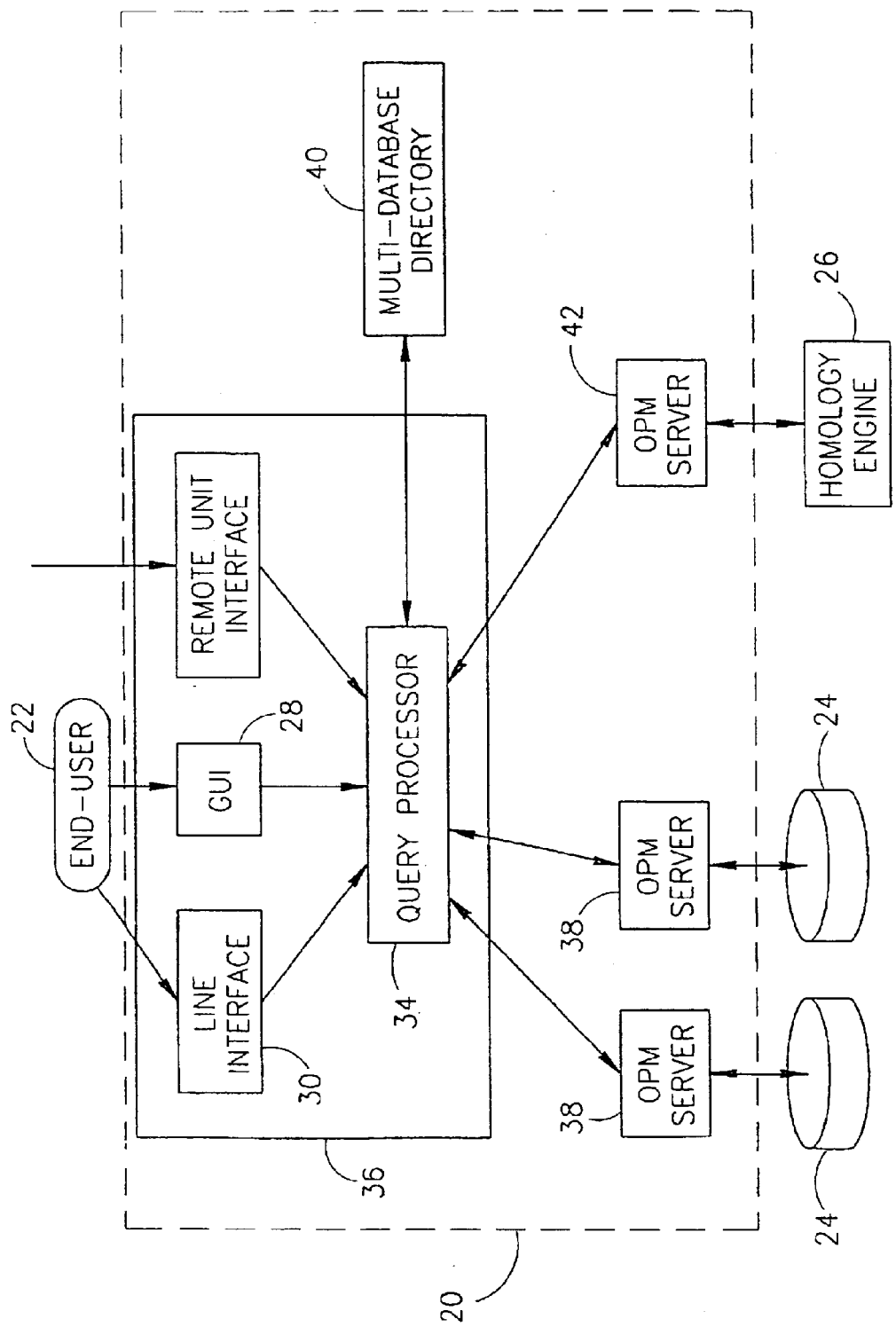
FIG. 1 is a schematic illustration of a multi-database query system, in accordance with an embodiment of the invention.

FIG. 1 is a schematic illustration of a multi-database query system 20, in accordance with an embodiment of the invention. System 20 mediates between an end-user 22, and a plurality of service providers which include databases 24 and one or more data manipulation servers, such as a homology search engine 26. Error detection processes are another example of data manipulation servers. Engine 26 is a data manipulation server in that it provides processing services and is not primarily used for storing and providing information. In some embodiments of the invention, engine 26 does not store information and a user requesting processing services must provide the information to be processed or must provide a link to a database or file containing the information. Data manipulation servers may receive a single input of data, e.g., error detection processes which receive a single sequence, or a plurality of inputs, e.g., homology engines which compare sequences from two different sources. One of the objects of some embodiments of the invention is to allow end-user 22 to relate to homology engine 26 and/or to other data manipulation servers as if they were databases 24.

Databases 24 may be organized differently from each other and are not generally controllable by a supervisor of system 20. End user 22 provides system 20 with queries in a query-language of system 20, for example a structured query language, such as OPM. In some embodiments of the invention, a single query may be directed to more than one service provider. For example, a single query may be directed to a plurality of databases 24 and to homology engine 26.

In some embodiments of the invention, system 20 comprises a graphical user interface 28 which receives queries in a graphical form and translates them into the system's query language. Alternatively or additionally, system 20 comprises a command-line interface 30 which receives commands from end-user 22 directly in the system's query language or possibly using natural language. Further alternatively or additionally, system 20 comprises a remote-unit interface 32 which receives queries from remote computer units.

System 20 further comprises a multi-database query processor 34 which receives queries from interfaces 28, 30 and/or 32 and processes them, as described hereinbelow. In some embodiments of the invention, query processor 34 and interfaces 28, 30 and/or 32 are implemented in software on a single computer 36 accessible to end-user 22. Alternatively, a distributed configuration is used.

In some embodiments of the invention, system 20 further comprises, for each database 24, an OPM translation server 38 that mediates between processor 34 and the respective service provider. In some embodiments of the invention, translation servers 38 translate queries from the query language of system 20 into query languages supported by the respective database 24. Optionally, translation servers 38 translate query results received from the databases 24 into the structural object classes of system 20.

In a similar manner, system 20 comprises an OPM translation server 42 which mediates between processor 34 and homology engine 26. In some embodiments of the invention, translation server 42 translates query portions from the query language of system 20 into commands supported by homology engine 26. That is, the OPM language allows, in accordance with embodiments of the invention, phrasing queries that access homology engine 26 as a database. Translation server 42 translates query directives, such as limitations, into commands to be performed by homology engine 26. In addition, translation server 42 optionally translates the output from homology engine 26 into structural objects, in accordance with the query language used by system 20. An exemplary structural definition of objects used to access a homology engine from the OPM suite is described in Table 1.

TABLE 1

```
SCHEMA blast_srv
DESCRIPTION: "The OPM schema for a queryable blast server"
CONTROLLED VALUE CLASS BlastEngine_Cv
{"wu_blast 2.0", "ncbi_blast 2.0"}
DEFAULT: "wu_blast 2.0"
CONTROLLED VALUE CLASS BlastProgram_Cv
{"blastn", "blastx", "blastp", "tblastn", "tblastx"}
DEFAULT: "blastn"
CONTROLLED VALUE CLASS Strand_Cv
{"top", "bottom", "both"}
DEFAULT: "both"
CONTROLLED VALUE CLASS SortBy_Cv
{"pvalue", "count", "highscore", "totalscore"}
DEFAULT: "pvalue"
CONTROLLED VALUE CLASS GenCode_Cv
{("Standard or Universal", 1),
("Vertebrate Mitochondrial", 2),
("Yeast Mitochondrial", 3),
("Mold, Protozan,. . .",4),
("Invertebrate Mitochondrial", 5),
("Ciliate Macronuclear", 6),
("Encinodermate Mitochondrial",9),
("Alternative Ciliate Macronuclear", 10),
("Eubactrial", 11),
("Alternative Yeast", 12),
("Ascidian Mitochondrial", 13),
("Flatworm Mitochondrial", 14)
}
DEFAULT: "Standard or Universal"
CODE_TYPE: SMALLINT
CONTROLLED VALUE CLASS Filter_Cv
{("none", 0),
("seg", 1),
("xnu", 2),
("seg+xnu", 3),
("dust", 4)
}
DEFAULT: "none"
CODE_TYPE: SMALLINT
CONTROLLED VALUE CLASS Matrix_Cv
{("blosum62", 0),
("blosum35", 1),
("blosum40", 2),
("blosum45", 3),
("blosum50", 4),
("blosum65", 5),
("blosum70", 6),
("blosum75", 7),
("blosum80", 8),
("blosum85", 9),
("blosum95", 10),
("blosum100", 11),
("GONNET", 12),
("pam10", 13),
("pam20", 14),
("pam30", 15),
("pam40", 16),
("pam50", 17),
("pam60", 18),
("pam70", 19),
("pam80", 20),
("pam90", 21),
("pam100", 22),
("pam110", 23),
("pam120", 24),
("pam130", 25),
("pam140", 26),
("pam150", 27),
("pam160", 28),
("pam170", 29),
("pam180", 30),
("pam190", 31),
("pam200", 32),
("pam210", 33),
("pam220", 34),
("pam230", 35),
```

TABLE 1-continued

```
("pam240", 36),
("pam250", 37),
("pam260", 38),
("pam270", 39),
("pam280", 40),
("pam290", 41),
("pam300", 42),
("pam310", 43),
("pam320", 44),
("pam330", 45),
("pam340", 46),
("pam350", 47),
("pam360", 48),
("pam370", 49),
("pam380", 50);
("pam390", 51),
("pam400", 52),
("pam410", 53),
("pam420", 54),
("pam430", 55),
("pam440", 56),
("pam450", 57)
}
DEFAULT: "blosum62"
CODE_TYPE: SMALLINT
CONTROLLED VALUE CLASS DB_Cv
{"testdb", "localdb", "dbest"}
DEFAULT: "testdb"
OBJECT CLASS Blast_Call
DESCRIPTION: "A blast call object represents a particular homology
search using a blast engine"
ID: callId
ATTRIBUTE callId: INTEGER REQUIRED
ATTRIBUTE engine: BlastEngine_Cv REQUIRED
ATTRIBUTE program: BlastProgram_Cv REQUIRED
ATTRIBUTE query: VARCHAR(2000) REQUIRED
ATTRIBUTE datasource: DB_Cv REQUIRED
ATTRIBUTE output: set-of[1,] Blast_Output REQUIRED
ATTRIBUTE matrix: Matrix_Cv OPTIONAL
ATTRIBUTE strand: Strand_Cv OPTIONAL
ATTRIBUTE sortby: SortBy_Cv OPTIONAL
ATTRIBUTE dbgcode: GenCode_Cv OPTIONAL
ATTRIBUTE filter: Filter_Cv OPTIONAL
ATTRIBUTE threshold: REAL OPTIONAL
ATTRIBUTE alignments: INTEGER OPTIONAL
ATTRIBUTE scores: INTEGER OPTIONAL
ATTRIBUTE param_E: REAL OPTIONAL
ATTRIBUTE param_S: REAL OPTIONAL
ATTRIBUTE param_E2: REAL OPTIONAL
ATTRIBUTE param_S2: REAL OPTIONAL
ATTRIBUTE param_W: INTEGER OPTIONAL
ATTRIBUTE param_T: INTEGER OPTIONAL
ATTRIBUTE param_X: INTEGER OPTIONAL
ATTRIBUTE param_N: INTEGER OPTIONAL
ATTRIBUTE param_M: INTEGER OPTIONAL
ATTRIBUTE param_B: INTEGER OPTIONAL
ATTRIBUTE param_V: INTEGER OPTIONAL
OBJECT CLASS Blast_Output
DESCRIPTION: "The output of a specific blast call"
ID: runId
ATTRIBUTE runId: INTEGER REQUIRED
ATTRIBUTE program: VARCHAR(8) REQUIRED
ATTRIBUTE version: VARCHAR(20) REQUIRED
ATTRIBUTE revision: VARCHAR(20) REQUIRED
ATTRIBUTE build: VARCHAR(40) REQUIRED
ATTRIBUTE queryId: VARCHAR(20) REQUIRED
ATTRIBUTE querySeq: VARCHAR(2000) REQUIRED
ATTRIBUTE queryLength: INTEGER REQUIRED
ATTRIBUTE database: DB_Cv REQUIRED
ATTRIBUTE hits: set-of[1,] BlastHits REQUIRED
ATTRIBUTE dbSize_Seqs: INTEGER REQUIRED
ATTRIBUTE dbSize_Letters: INTEGER REQUIRED
ATTRIBUTE dbFile: VARCHAR(80) REQUIRED
ATTRIBUTE dbReleased: VARCHAR(40) REQUIRED
ATTRIBUTE dbPosted: VARCHAR(40) REQUIRED
ATTRIBUTE hitSatE: INTEGER REQUIRED
ATTRIBUTE searchTime: VARCHAR(40) REQUIRED
ATTRIBUTE totalTime: VARCHAR(40) REQUIRED
ATTRIBUTE runDate: VARCHAR(40) REQUIRED
```

TABLE 1-continued

ATTRIBUTE parameters: set-of[1,] OutputParameters REQUIRED
OBJECT CLASS OutputParameters
ID: paramId
ATTRIBUTE paramId: INTEGER REQUIRED
ATTRIBUTE strand: VARCHAR(10) REQUIRED
ATTRIBUTE frame: VARCHAR(10) REQUIRED
ATTRIBUTE matrixId: VARCHAR(10) REQUIRED
ATTRIBUTE matrixName: VARCHAR(10) REQUIRED
ATTRIBUTE lamdba_Used: VARCHAR(10) REQUIRED
ATTRIBUTE K_Used: VARCHAR(10) REQUIRED
ATTRIBUTE H_Used: VARCHAR(10) REQUIRED
ATTRIBUTE lamdba_Computed: VARCHAR(10) REQUIRED
ATTRIBUTE K_Computed: VARCHAR(10) REQUIRED
ATTRIBUTE H_Computed: VARCHAR(10) REQUIRED
ATTRIBUTE param_E1: VARCHAR(10) REQUIRED
ATTRIBUTE param_S1: VARCHAR(10) REQUIRED
ATTRIBUTE param_W1: VARCHAR(10) REQUIRED
ATTRIBUTE param_T1: VARCHAR(10) REQUIRED
ATTRIBUTE param_X1: VARCHAR(10) REQUIRED
ATTRIBUTE param_E2: VARCHAR(10) REQUIRED
ATTRIBUTE param_S2: VARCHAR(10) REQUIRED
OBJECT CLASS BlastHeader
DESCRIPTION: "The header section of BLAST output"
ID: headerId
ATTRIBUTE headerId: INTEGER REQUIRED
ATTRIBUTE program: VARCHAR(8) REQUIRED
ATTRIBUTE version: VARCHAR(20) REQUIRED
ATTRIBUTE revision: VARCHAR(20) REQUIRED
ATTRIBUTE build: VARCHAR(40) REQUIRED
ATTRIBUTE queryId: VARCHAR(20) REQUIRED
ATTRIBUTE querySeq: VARCHAR(2000) REQUIRED
ATTRIBUTE database: DB_Cv REQUIRED
ATTRIBUTE numOfSequences: INTEGER REQUIRED
ATTRIBUTE numOfLetters: INTEGER REQUIRED
OBJECT CLASS BlastHits
DESCRIPTION: "Blast Hits"
ID: accession
ATTRIBUTE accession: VARCHAR(12) REQUIRED
ATTRIBUTE description: VARCHAR(255) REQUIRED
ATTRIBUTE score: INTEGER REQUIRED
ATTRIBUTE pvalue: REAL REQUIRED
ATTRIBUTE num: INTEGER REQUIRED
ATTRIBUTE length: INTEGER OPTIONAL
ATTRIBUTE hsp: set-of[1,] BlastHSP OPTIONAL
OBJECT CLASS BlastHSP
ID: hspId
ATTRIBUTE hspId: INTEGER REQUIRED
ATTRIBUTE score: INTEGER REQUIRED
ATTRIBUTE expect: REAL REQUIRED
ATTRIBUTE pvalue: REAL REQUIRED
ATTRIBUTE strand1: VARCHAR(1) REQUIRED
ATTRIBUTE strand2: VARCHAR(1) REQUIRED
ATTRIBUTE identities: REAL REQUIRED
ATTRIBUTE positives: REAL REQUIRED
ATTRIBUTE query (sequence, begin, end):
(VARCHAR(500) REQUIRED, INTEGER REQUIRED, INTEGER REQUIRED)
ATTRIBUTE target (sequence, begin, end):
(VARCHAR(500) REQUIRED, INTEGER REQUIRED, INTEGER REQUIRED)
ATTRIBUTE align: VARCHAR(500) REQUIRED
ATTRIBUTE t5_begin: INTEGER REQUIRED
ATTRIBUTE t5_end: INTEGER REQUIRED The structural definition of Table 1 is written in a language used to define OPM objects, described for example in Chen, I. A.; Kosky, A. S.; Markowitz, V. M.; Szeto, E.; and Topaloglou, T., 1998. "Advanced Query Mechanisms for Biological Databases" in Proceedings of the 6$^{th}$ International Conference on Intelligent systems for Molecular biology (ISMB'98), the disclosure of which is incorporated herein by reference.

Alternatively or additionally, a single translation server 38 may be used for more than one service provider. Alternatively or additionally, OPM processor 34 performs some or all of the translation tasks of translation servers 38 and 42.

In some embodiments of the invention, OPM servers 38 and 42 are situated on the same computer as their respective service providers 24 and 26. Alternatively, OPM servers 38 and 42 are located on computers proximal to their respective service providers 24 and 26, although translation servers may be located substantially anywhere.

In some embodiments of the invention, a multi-database directory 40 is used by processor 34 to determine to which service provider 24 and 26, the portions of a query are directed. Directory 40 summarizes the contents, organization methodologies and capabilities of databases 24 and engines 26. In some embodiments, a single directory is used for a plurality of query processors 34, such that adding additional service providers to system 20 requires only preparing a respective OPM server for the additional service providers and updating directory 40, while no changes are needed in processors 34.

In some embodiments of the present invention, the various components of system 20 interact using a distributed-object technology, such as, the Common Object Request Broker Architecture (CORBA) which is described, for example, in the Web Site of the "Object Management Group" (OMG) at www.omg.org and was available on Jun. 27, 1999. The disclosure of this web site is incorporated herein by reference. In some embodiments of the invention, a plurality of different CORBA interfaces are used in system 20 for different types of interactions between the components of system 20. In one example, a first CORBA interface is used for programming and a second interface is used for object transfer and/or sharing. Optionally, remote-unit interface 32 also comprises a CORBA interface.

Alternatively or additionally, other distributed-object technologies, such as, Microsoft's Component Object Model (COM) or the UNIX environment Remote procedure call (RPC), may be used to allow remote and/or non-remote components of system 20 to interact. Further alternatively or additionally, system 20 may be implemented in its entirety by a single process and/or on a single processor.

TABLE 2

| (1) | SELECT | l = r.fragId, a = h.accessor |
|---|---|---|
| (2) | FROM | r in local:Fragments |
| (3) | | bc in blast:Blast_Call |
| (4) | | bo in bc.output |
| (5) | | h = bo.summary.sequence |
| (6) | WHERE | r.finished = "today" and |
| (7) | | bc.querySeq = r.sequence and |
| (8) | | bc.command = "blastn" and |
| (9) | | bc.dataSource = "dbEST" and |
| (10) | | h.length > 300 |

Table 2 illustrates a sample query received by query processor 34 from any of interfaces 28, 30 and 32. The query in table 2 is written according to the OPM query language described, for example, in the ISMB'98 publication referenced hereinabove. This OPM query language allows accessing a plurality of databases 24 from a single query. The query of table 2 relates to both a database 24 and an homology engine 26, the homology engine being accessed as if it were a database.

The query in table 2 is built of three sections. A first section labeled SELECT states the fields which are to appear in the output generated responsive to the query. In table 2 these fields are a "fragId" field of a variable r, and an "accessor" field of a variable h (the variables r and h are defined in the second section). A second section, labeled WHERE, defines the variables mentioned in the query by stating the database object classes to which they relate. That is, the second section states which objects are candidates for fulfilling the query.

In table 2, the variable r, for example, corresponds to a "Fragments" object class in a database named "local". In the same way, a dummy variable "bc" corresponds to an object class named "Blast_Call" in a pseudo database "blast". However, unlike variable r which represents an actual field of data in a database 24, variable "bc" does not represent any such field, and a database "blast" does not actually exist.

Rather, when the "blast" database is referred to in a query, processor 34 refers to homology engine 26. In some embodiments of the invention, translation server 42 performs any required translations to the input and output of homology engine 26, such that the homology engine appears to processor 34 as a database. In an exemplary embodiment of the present invention, the entire interface with homology engine 26 is structured in a single translation object, for example, in accordance with the "Blast_Call" object class in table 2, which is defined in Table 1. The translation object includes the input to and output from homology engine 26. For example, the "Blast_Call" object class has fields which relate to the commands to engine 26, such as, a "command" field which states the type of command performed by engine 26, a "querySeq" field which states an input sequence to be compared by the engine and a "dataSource" field which states a database of sequences to which the input sequence is compared. In addition, the "Blast_Call" object class has an "output" field into which the output from homology engine 26 is preferably structurally stored. In the query of table 2, a dummy variable, "bo", refers to the sub-object "output", thus simplifying the query statements.

When a query relates to an action, such as a search or a filter to be performed in a pseudo database, processor 34 first has the respective engine 26 perform any required commands to fill up the output fields of the object representing the pseudo database, e.g., "Blast_Call", and only then the search is performed. Alternatively or additionally, as the output records become available from homology engine 26 they are sent for further processing. In some cases, the records can be processed even before all the fields are available from engine 26. One example of a query optimization as applied to data manipulation servers is that the query translator instructs the engine to prepare only those result fields which are actually required for further processing or display. Another example of optimization is allowing some of the fields to be provided at a later time than other fields. Modifying the order of generation of fields, even between records, may be useful if the some fields are required for further data manipulation or for a querying against a slow database and are thus time critical. For some types of data manipulation, it may even be useful to start the manipulation with only part of the fields and then repeat the manipulation with the rest of the fields. One example where it is useful to start manipulating before all the fields are available is where the manipulation can be carried out, at least to some extent, without the field or where the value of the field or the range of possible values of the field can be known. Thus, for example, a DNA homology can be failed based on both of the strands not matching, even before it is known which strand needs to be matched. Once the strand information is available, the group of accepted matches can be further limited using that information.

Thus, system 20 can have different parts of a query evaluated in parallel, in particular, time consuming parts performed by data manipulation servers. For example, homology engine 26 may begin to operate as records from another part of a query become available, and/or the output from engine 26 may be processed as it is provided, without waiting for all the results. This parallelism is possible because homology engine 26 is accessed from within the query. An advantage of some embodiments of the invention is the savings in response time and in communication and CPU resources of complex queries due to this parallelism.

In some cases, such parallel processing of data manipulation may require the data manipulation server or the data manipulation program itself to be modified to take the timing information into account. In one example, a blast server may associate the actual partial information used with a result record set, so that it can further limit the search results after the fact.

A third section of the query, labeled WHERE, states the conditions to be fulfilled by those objects selected by the query. In table 2 these conditions include that a field named "finished" of the variable r must have a value "today", a field "querySeq" of the variable bc must have a value equal to the value of the field "sequence" of variable r, etc. In this section, the conditions on database objects and on pseudo database objects are stated substantially in the same way.

Figure 2:
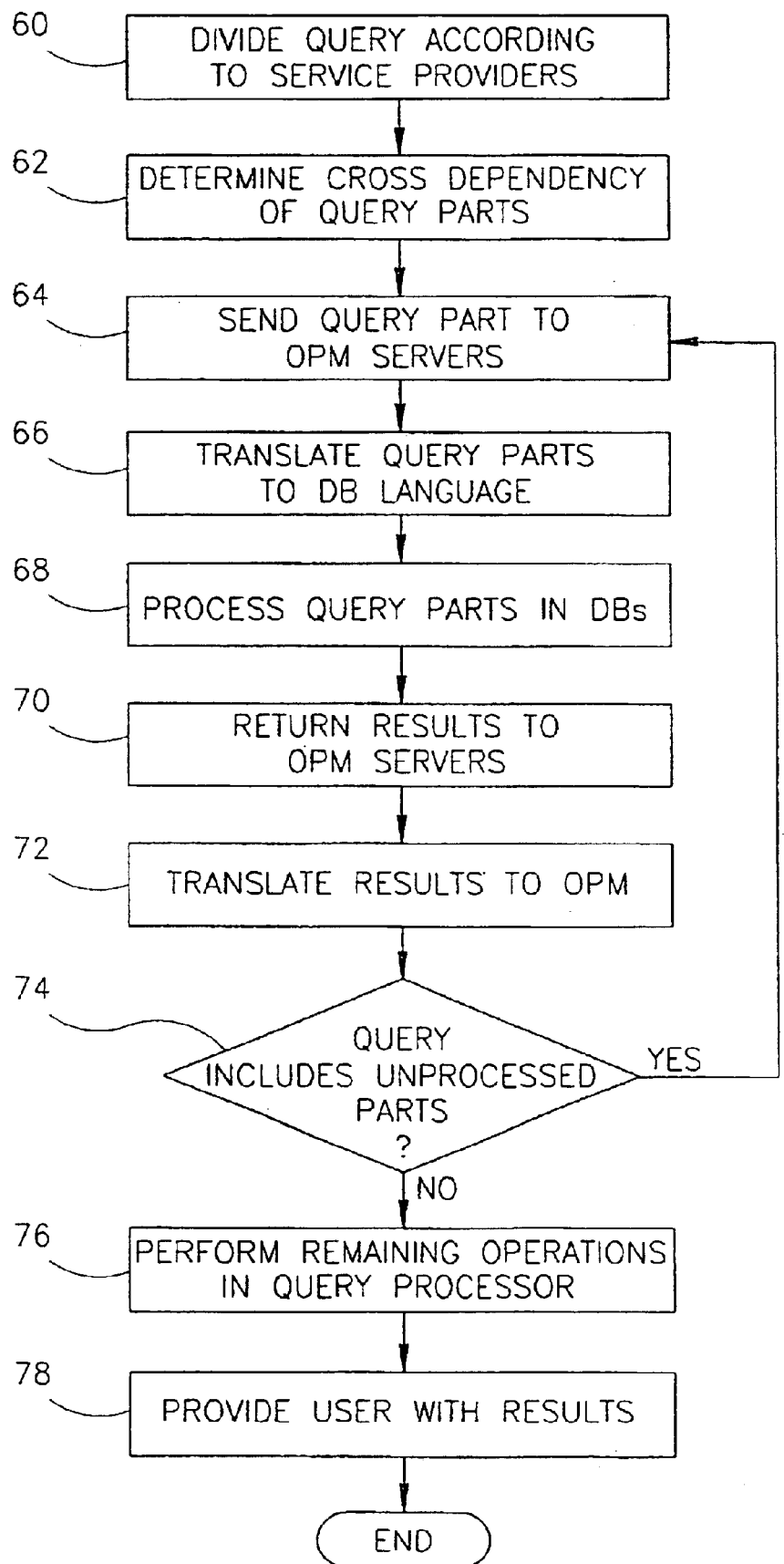
FIG. 2 is a flowchart of the actions performed by the multi-database query system of FIG. 1, in accordance with an embodiment of the present invention.

FIG. 2 is a flowchart of the actions performed in processing a query by system 20, in accordance with an embodiment of the present invention. Upon receiving a query, such as the query in table 2, processor 34 divides (60) the query into parts which are performed by the various service providers 24 and 26. Processor 34 determines, for example using methods known in the art, to which service provider each line in the query is directed. In an exemplary embodiment of the present invention, the determination is performed by reference to directory 40. In the query of table 2, processor 34 determines from the second line that variable r is to be searched in the database 24 named "local". From the third line it is determined that variable bc is to be "searched" in engine 26 named "blast". Therefore, lines 2 and 6 of the query are directed to the database "local" and lines 3, 7, 8 and 9 are directed to homology engine 26. Lines 1, 4, 5 and 10 do not refer to any database and therefore they are processed by processor 34.

Processor 34 then determines (62) the cross-dependence of the parts of the query, i.e., which parts require data from other parts and therefore must receive the data from the other parts before they are performed. In table 2, it is determined from the line 7 that the query part directed to homology engine 26 requires output from another query part.

Thereafter, processor 34 sends (64) to OPM translation servers 38 and/or 42 a first round of query parts belonging to their respective service providers 24 and 26. The query parts sent in the first round are those which do not require results from other queries. In table 2, the part relating to variable r, i.e., lines 2 and 6, are sent to the OPM server 38 of database "local". These lines designate a query for all the Fragment objects in the database which have a value "today" in their "finished" field. The OPM server translates (66) the received query part into a language recognized by database "local". The translated query part is passed to the database 24 which processes (68) the query and returns (70) the results of the query to the respective OPM server 38. The OPM server 38 translates (72) the results received from the database 24 into the OPM result format and passes the translated results to processor 34.

If (74) the query includes additional query parts which were not performed yet, e.g., query parts dependent on results from other queries, steps 64, 66, 68, 70 and 72 are repeated for the additional query parts. In the example of table 2, the query part formed of lines 3, 7, 8 and 9 is passed to the translation server 42 of homology engine 26. The translation server 42 translates (66) the query part into commands performed by homology engine 26. For each sequence of variable r in the output of database "local", translation server 42 sends a "blastn" command to engine 26 to perform a homology comparison between the sequence and the database "dbEST". The results received from engine 26 are summarized (72) by translation server 42 in the "output" field of the "Blast_Call" object.

In some embodiments of the present invention, system 20 begins a second round of processing query parts before a first round on which the second round depends, is finished. Rather, as the first round provides records as results, the second round can manipulate them.

Once all the query parts were handled by their respective service providers 24 and 26, processor 34 performs (76) any remaining operations in the queries and provides (78) the user with the results required in the SELECT section of the query. In the example of table 2, processor 34 performs the comparison in line 10 of the query. Variable h refers to the field "sequence" of the sub-object "summary" of the object "output", which represents the results from the blast comparison. Sequences having a length greater than 300 are selected from the blast results. The user is then provided with the value of the "accessor" field of the variable h and with the value of the "fragId" field of the variable r, for all the objects which fulfill the query.

The above description has focused on BLAST as a homology method, however, other types of homology servers may also be used, for example BLASTX, BLASTN and BLASTP. Additionally, other types of data manipulation may be provided, for example, error correction, in which a sequence is corrected for various types of errors. Another type of data manipulation server is for example a server which guesses a ternary structure of a protein from its sequence, for example the number of alpha helixes or the protein's affinity to a certain DNA sequence. Alternatively to guessing the structure, the server may provide a grading facility which grades a list of provided sequences for affinity to the protein (or for similarity of their derived protein) or which selects those sequences which have a certain affinity.

As can be appreciated, some of these data manipulation servers require only one input record set while others, require more than one input record set. For example, a homology search can compare a first set of records against records in a second database (fixed value) or against a second set of provided records. In some cases, three or more inputs may be provided, for example where a third record set includes a list of rules which apply when comparing the two record sets. In some cases, all the record sets need to be fully specified before the manipulation can be performed. In other cases, only one or possibly not even one of the record sets needs to be fully specified before starting the manipulation. The considerations for optimizing and performing in parallel can be applied to the availability of record sets as well. In some embodiments of the invention, the definitions of how the data manipulation server operates in the absence of data and/or the relative computation time for different tasks thereby are stored in directory 40, optionally along with other information useful for optimizing queries which include data manipulation.

An advantage of some of the above embodiments is that it is possible to use substantially any tool developed for manipulation of databases to access data manipulation servers. For example, graphic interface 28 may be an interface developed solely for preparing queries for database servers, as described, for example, in Kosky, A. S., Chen, I. A., Markowitz, V. M., and Szeto, E. "Exploring Heterogeneous Biological Databases: Tools and Applications", Proceedings of the 6th International Conference on Extending Database Technology (EDBT'98), Lecture Notes in Computer Science, Vol. 1377, Springer-Verlag, 1998, pp. 499–513, the disclosure of which is incorporated herein by reference. A user may use this interface to prepare sophisticated queries which include access to data manipulation servers, such as homology search engines.

Likewise, optimization tools designed for database queries may be applied, in accordance with the above embodiments, to queries which include reference to data manipulation servers. Such optimization is especially important for queries which reference data manipulation servers because usually these servers require substantially more processing time than databases.

Furthermore, the results of the queries are optionally provided in a single common format which allows use of a single standard output interface to display the results.

In addition, variables representing database and pseudo database objects may be linked together using methods for linking databases described, for example, in the EDBT'98 publication referenced hereinabove. These linking methods allow simpler statement of queries and hence more transparency to the user who does not need to know the structure of the various servers used.

Although the above described embodiments refer to queries which relate to data manipulation servers as to databases, some embodiments of the invention relate to queries which include commands to be performed by data manipulation servers, not necessarily in the same manner in which databases are searched. For example, a query may include an explicit command to be carried out by a data manipulation server, e.g., homology engine 26. Such commands are referred to herein as application specific data type (ASDT) commands.

TABLE 3

| (1) | SELECT | l = r.fragId, a = h.accessor |
|---|---|---|
| (2) | FROM | r in local:Fragments |
| (3) | | b in blast:Output |
| (4) | | h = bo.summary.sequence |
| (5) | WHERE | r.finished = "today" and |
| (6) | | r.sequence.blast("dbEST") and |
| (7) | | b.query = r.sequence and |
| (8) | | h.length > 300 |

Table 3 shows a query similar to the query of table 2 in which homology engine 26 is activated using explicit commands written in a format acceptable by OPM processor 34. Line 6 in table 3 is a command to perform "blast" on the "sequence" fields of the possible values of variable r. The blast is performed against a database "dbEST". The results from performing the blast command appear in a variable b which is defined in line 3 of table 3.

In an embodiment of the present invention, when processor 34 encounters an ASDT command, such as the "blast" command on line 6, it first checks with the database involved, i.e., the "local" database, whether the database supports the command in the specific syntax. Then, processor 34 consults directory 40 to determine a server which has the routine invoked by the command. Processor 34 passes the ASDT command, with whatever data objects to which the command relates, directly to the determined server. Alternatively, the command is passed through translation server 42. The output from the server is optionally passed to processor 34 in a structured form, as described above, so as to allow easy manipulation of the results. In this embodiment, processor 34 does not model homology engine 26 as a database 24, but does access the homology engine from within a complex query which accesses databases.

The ASDT commands do not necessarily appear in the WHERE section of the query. Table 4 shows a query in which a command appears in the SELECT section of the query. The command is processed after the query is evaluated, at a stage of presenting the results of the query.

TABLE 4

| (1) | SELECT | x.gelId |
|---|---|---|
| (2) |  | x.image.crop(0,0,200,400).display() |
| (3) | FROM | x in Gel |
| (4) | WHERE | x.gelId = "gel_000111" |

In table 4, an "image" field of the variables x which satisfy the query are passed to a routine "crop", which returns a piece of an image having specified coordinates. The results from the routine "crop" are passed to a routine "display" which displays the result in any desired manner.

The routines referenced by the ASDT commands may be evaluated by a data manipulation server as described above with reference to the blast command evaluated by homology engine 26. Alternatively or additionally, some routines may be situated within processor 34 or in directory 40. The statement of the commands within a query rather than invoking the commands on the results received from a query, is simpler to the user. In addition, invoking the commands from within the query allows performing the command before the results are passed to end-user 22. In many cases this conserves substantial communication resources.

In some cases users accessing databases are frequently interested in attributes which may be extracted from the image of a complex data field, for example, a gel. Such attributes include, for example, the length of an image of the gel, its average intensity or specific lanes of the image. Therefore, some databases have redundant data fields which have values for these attributes. By using ASDT commands these redundant fields are not needed. The routines invoked by the ASDT commands may be stored in the database 24, on a separate data manipulation server, in directory 40 and/or in processor 34.

It is noted that the ASDT commands may be invoked implicitly as described above with reference to FIG. 2. In some embodiments of the invention, for each command, a command data object is defined which includes input and output fields of the command. An access to an output field of the object is translated by system 20 as an implicit invocation of the command.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus. Especially, the above methods should be interpreted to describe software for carrying out a complete method as described above, a part thereof or software which modifies an existing software to perform as described above. In addition, the scope of the invention includes such software stored in a computer readable media, such as a disk, stored in a memory or executing on a computer.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. A multi-database query system for querying a plurality of biological databases containing biological data, comprising:

an input which receives a query in a structured form;

a processor for receiving the query and dividing the query into a plurality of query parts, wherein the plurality of query parts corresponds to at least one database of the plurality of biological databases and at least one condition statement; and at least one translation server which translates at least one at least one of the plurality of query parts into commands recognized by a data manipulation server associated with a biological database of the plurality of biological databases and returns results of the query parts to the processor;

wherein the processor determines whether the query includes unprocessed parts and, if the query has unprocessed parts, sends at least one unprocessed part to the at least one translation server, repeating the process until all unprocessed parts are processed, and wherein the processor further applies one or more conditions within the at least one condition statement to the processed query and generates a user output meeting the one or more conditions.

2. The system according to claim 1, wherein the translation server models results from the data manipulation server into database objects.

3. The system according to claim 1, wherein the data manipulation server comprises a server that receives input from a least two different sources.

4. The system according to claim 1, further comprising a directory in communication with the processor, wherein the processor refers to the directory to determine how to divide the query.

5. The system according to claim 1, wherein the at least one translation server comprises at least two translation servers associated with at least one local biological database and at least one remote database.

6. The system according to claim 5, wherein the query parts are sent to the at least two translation servers in parallel.

7. The system according to claim 1, wherein the data manipulation server is a homology search engine.

8. The system according to claim 7, wherein the homology search engine is BLAST.

9. The system according to claim 1, wherein the processor further determines cross-dependence of the query parts and, if cross-dependence is found, further divides the query parts into independent parts and dependent parts.

10. The system according to claim 9, wherein the query parts are cross-dependent and are sent to at least two translation servers sequentially so that independent parts are sent before dependent parts.

11. A method of querying a multi-database query system having a plurality of biological databases containing biological data, comprising:

(a) inputting a query in a structured form;

(b) receiving the query in a processor and dividing the query into a plurality of query parts, wherein the plurality of query parts corresponds to at least one database of the plurality of biological databases and at least one condition statement;

(c) using at least one translation server, translating at least one of the plurality of query parts into commands recognized by a data manipulation server associated with a biological database of the plurality of biological databases and returns results of the query parts to the processor;

(d) determining whether the query includes unprocessed parts and, if the query has unprocessed parts, sending at least one unprocessed part to the at least one translation server;

(e) repeating steps (c) and (d) until all unprocessed parts of the query are processed;

(f) applying one or more conditions within the at least one condition statement to the processed query; and (g) generating a user output meeting the one or more conditions.

12. The method according to claim 11, wherein the at least one translation server models results from the data manipulation server into database objects.

13. The method according to claim 11, wherein the data manipulation server comprises a server that receives input from a least two different sources.

14. The method according to claim 11, further comprising consulting a directory in communication with the processor to determine how to divide the query.

15. The method according to claim 11, wherein the at least one translation server comprises at least two translation servers associated with at least one local biological database and at least one remote database.

16. The method according to claim 11, wherein the data manipulation server is a homology search engine.

17. The method according to claim 16, wherein the homology search engine is BLAST.

18. The method according to claim 11, wherein the query parts are sent to at least two translation servers in parallel.

19. The method according to claim 11, further comprising determining cross-dependence of the query parts and, if cross-dependence is found, dividing the query parts into independent parts and dependent parts.

20. The method according to claim 11, wherein the query parts are cross-dependent and further comprising sending to at least two translation servers sequentially with independent parts are sent before dependent parts.

* * * * *